United States Patent [19]

Wilson

[11] Patent Number: 5,168,651
[45] Date of Patent: Dec. 8, 1992

[54] FLOATING FISHING APPARATUS

[76] Inventor: Kenneth G. Wilson, 10751 Chateau Dr., Olive Branch, Miss. 38654

[21] Appl. No.: 808,469

[22] Filed: Dec. 16, 1991

[51] Int. Cl.$^5$ ............................................. A01K 97/12
[52] U.S. Cl. ........................................... 43/17; 43/15; 43/16; 43/26.1
[58] Field of Search ...................... 43/15, 16, 17, 17.5, 43/26.1

[56] References Cited

U.S. PATENT DOCUMENTS

| | | | |
|---|---|---|---|
| 1,253,746 | 1/1918 | Teeling | 43/17 |
| 2,122,836 | 7/1938 | Gegerfeldt | 43/15 |
| 2,786,294 | 3/1957 | Whitacre | 43/17 |
| 2,818,671 | 1/1958 | Crouch | 43/15 |
| 2,901,855 | 9/1959 | Todd | 43/17 |
| 3,010,238 | 11/1961 | Crumrine | 43/16 |
| 3,621,599 | 11/1971 | Uhlich | 43/15 |
| 4,378,652 | 4/1983 | Lindgren | 43/26.1 |
| 4,794,718 | 1/1989 | Tillman | 43/16 |
| 4,901,468 | 2/1990 | Blackledge | 43/17 |
| 5,044,108 | 9/1991 | Rinehart | 43/17 |

Primary Examiner—Kurt C. Rowan
Attorney, Agent, or Firm—Leon Gilden

[57] ABSTRACT

A fish mesh basket is fixedly and coaxially mounted to a torroidal flotation ring, wherein the ring includes at least one support loop to permit tethering of a plurality of the basket structures together. A signal illumination bulb is arranged to be switched off upon a fish strike in cooperation with a retraction reel spring-biased to retract a fish upon a fish strike. A modification of the invention includes swaying apparatus to effect a pitching and swaying of the organization upon water to enhance movement of the bait upon a fish hook structure.

6 Claims, 4 Drawing Sheets

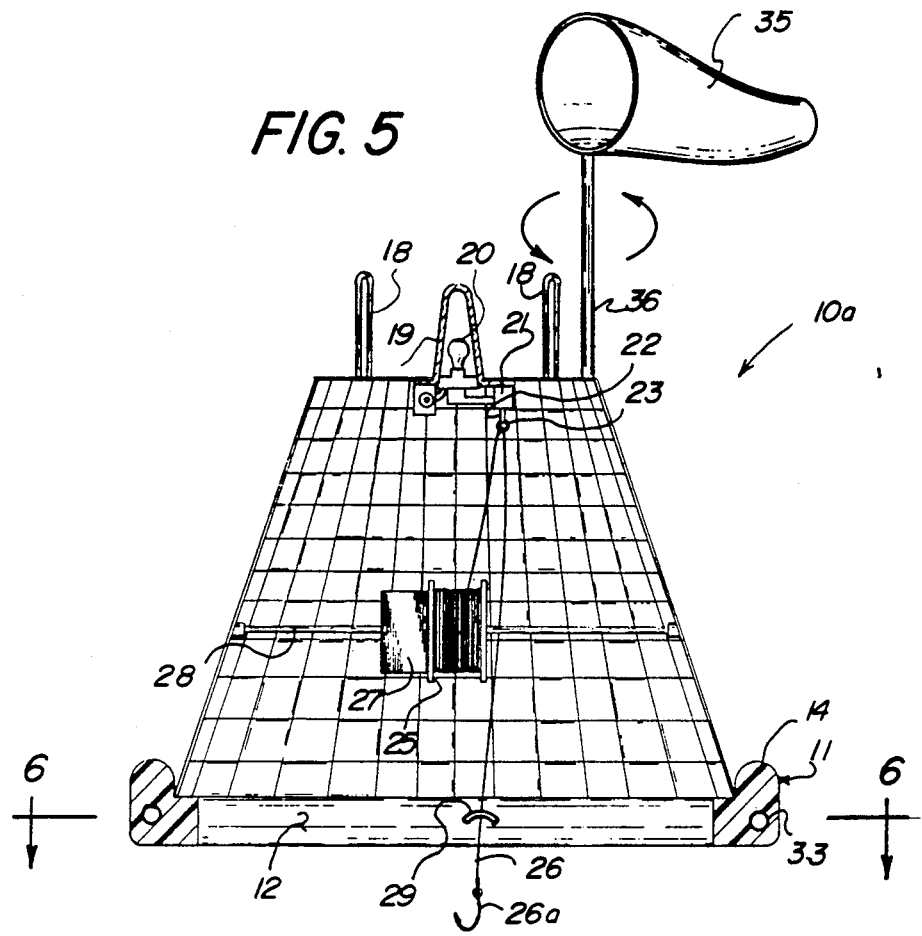
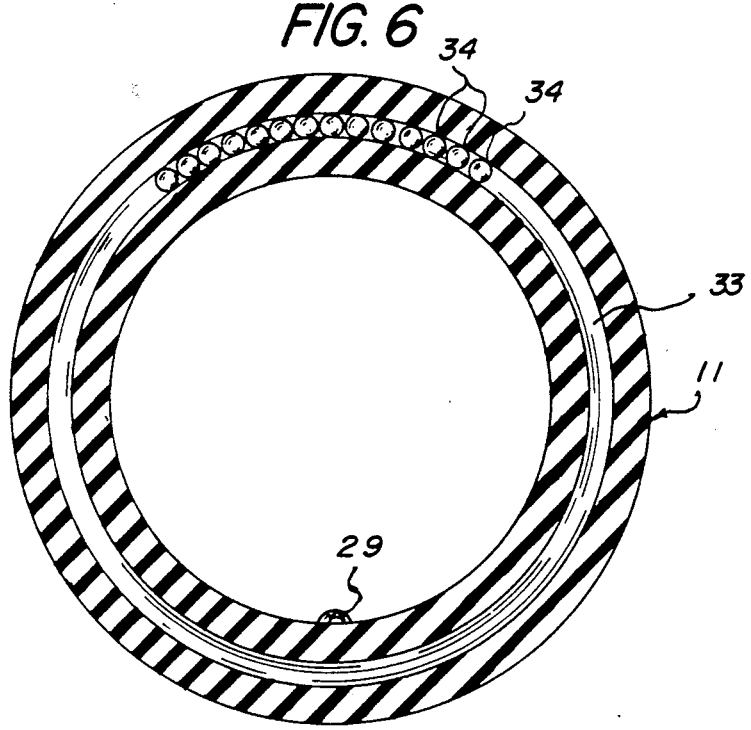

FLOATING FISHING APPARATUS

BACKGROUND OF THE INVENTION

1. Field of the Invention

The field of invention relates to fishing apparatus, and more particularly pertains to a new and improved floating fishing apparatus wherein the same is arranged to effect flotation of a device and automatic retraction upon a fish strike in association with a signal structure.

2. Description of the Prior Art

Floating fishing organizations are available in the prior art to provide for buoyant structure in association with fishing lines to effect capturing of a fish. Such structure is exemplified in U.S. Pat. No. 3,878,634 to Quimpo wherein a flotation fishing device utilizes a spring-loaded reel structure to effect the reeling of the associated fishing reel upon a fish strike.

U.S. Pat. No. 4,905,404 to Pasino, et al. sets forth a floating fish basket for use by divers to position fish therewithin.

U.S. Pat. No. 4,922,643 to Everett sets forth an illuminated fishing float.

U.S. Pat. No. 4,703,577 to Gubash sets forth a mesh fish basket utilizing a flotation ring secured to an upper end thereof to form a collar of the fish basket contained within a body of water.

The prior art fails to set forth an organization to both effect a simultaneous fishing, signalling, and capturing of fish interiorly of a mesh basket as set forth by the instant invention and in this respect, the present invention substantially fulfills this need.

SUMMARY OF THE INVENTION

In view of the foregoing disadvantages inherent in the known types of fishing apparatus now present in the prior art, the present invention provides a floating fishing apparatus wherein the same is arranged to automatically reel in a fish within a basket structure upon a fish strike. As such, the general purpose of the present invention, which will be described subsequently in greater detail, is to provide a new and improved floating fish apparatus which has all the advantages of the prior art fishing apparatus and none of the disadvantages.

To attain this, the present invention provides a fish mesh basket fixedly and coaxially mounted to a torroidal flotation ring, wherein the ring includes at least one support loop to permit tethering of a plurality of the basket structures together. A signal illumination bulb is arranged to be switched off upon a fish strike in cooperation with a retraction reel spring-biased to retract a fish upon a fish strike. A modification of the invention includes swaying apparatus to effect a pitching and swaying of the organization upon water to enhance movement of the bait upon a fish hook structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved floating fishing apparatus which has all the advantages of the prior art fishing apparatus and none of the disadvantages.

It is another object of the present invention to provide a new and improved floating fishing apparatus which may be easily and efficiently manufactured and marketed.

It is a further object of the present invention to provide a new and improved floating fishing apparatus which is of a durable and reliable construction.

An even further object of the present invention is to provide a new and improved floating fishing apparatus which is susceptible of a low cost of manufacture with regard to both materials and labor, and which accordingly is then susceptible of low prices of sale to the consuming public, thereby making such floating fishing apparatus economically available to the buying public.

Still yet another object of the present invention is to provide a new and improved floating fishing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic view of a modification of the invention.

FIG. 6 is an orthographic view, taken along the lines 6—6 of FIG. 5 in the direction indicated by the arrows.

DESCRIPTION OF THE PREFERRED EMBODIMENT

Figure 1:
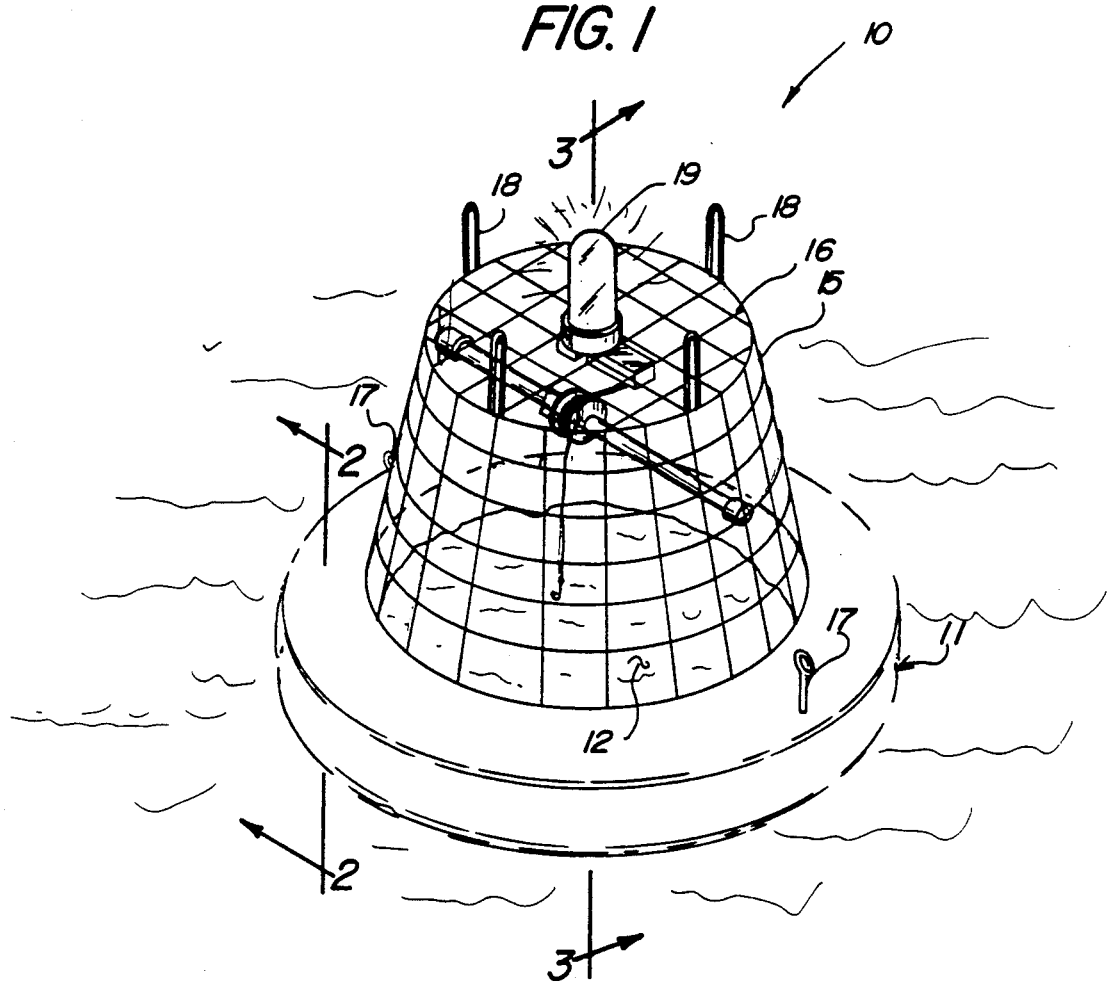
FIG. 1 is an isometric illustration of the instant invention.
Figure 2:
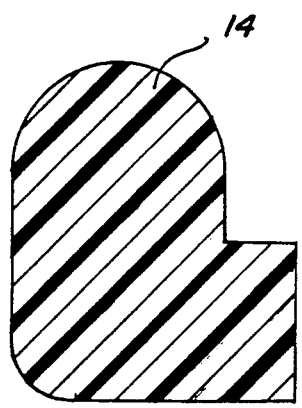
FIG. 2 is an orthographic view, taken along the lines 2—2 of FIG. 1 in the direction indicated by the arrows.
Figure 3:
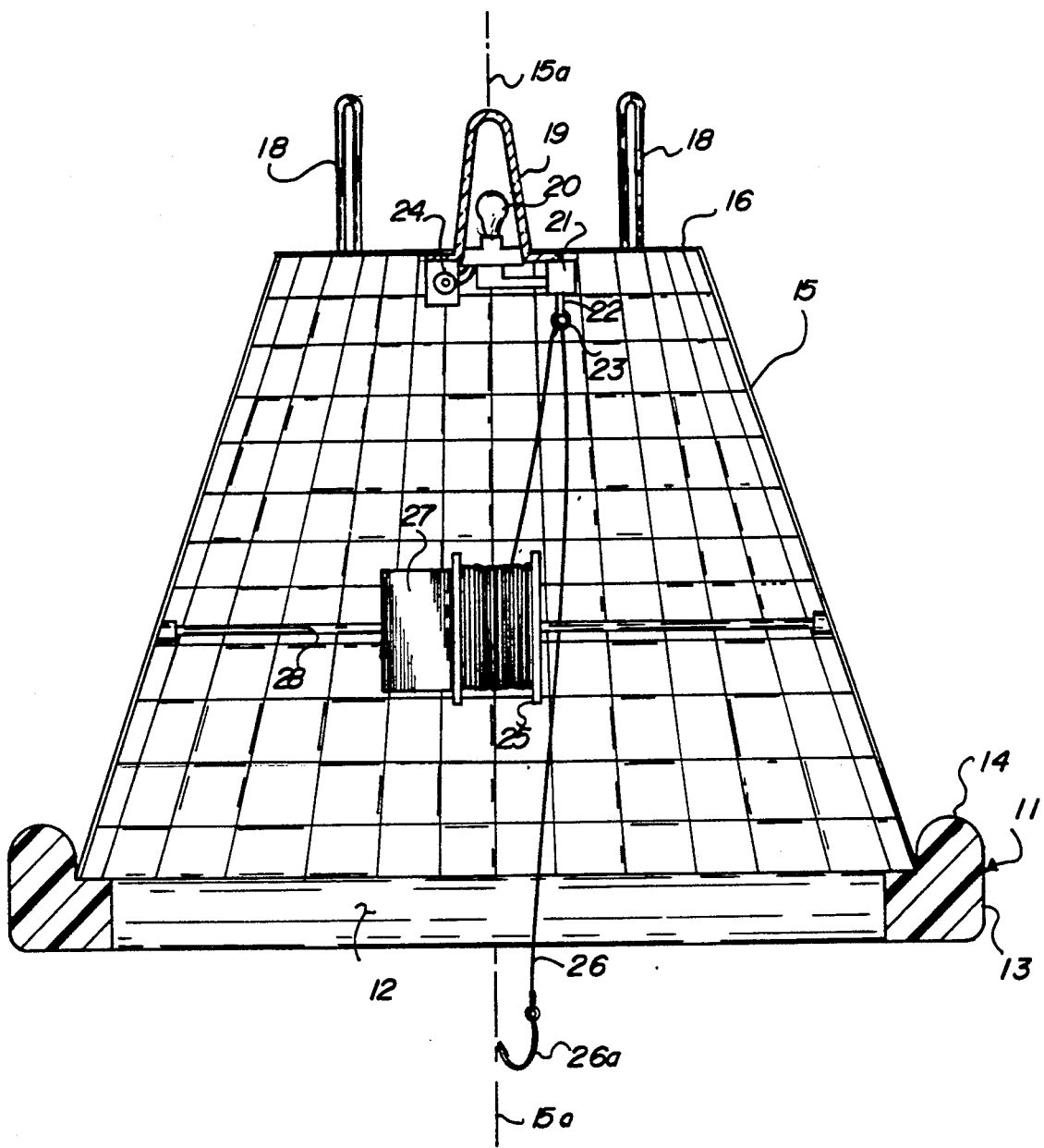
FIG. 3 is an orthographic view, taken along the lines 3—3 of FIG. 1 in the direction indicated by the arrows.
Figure 4:
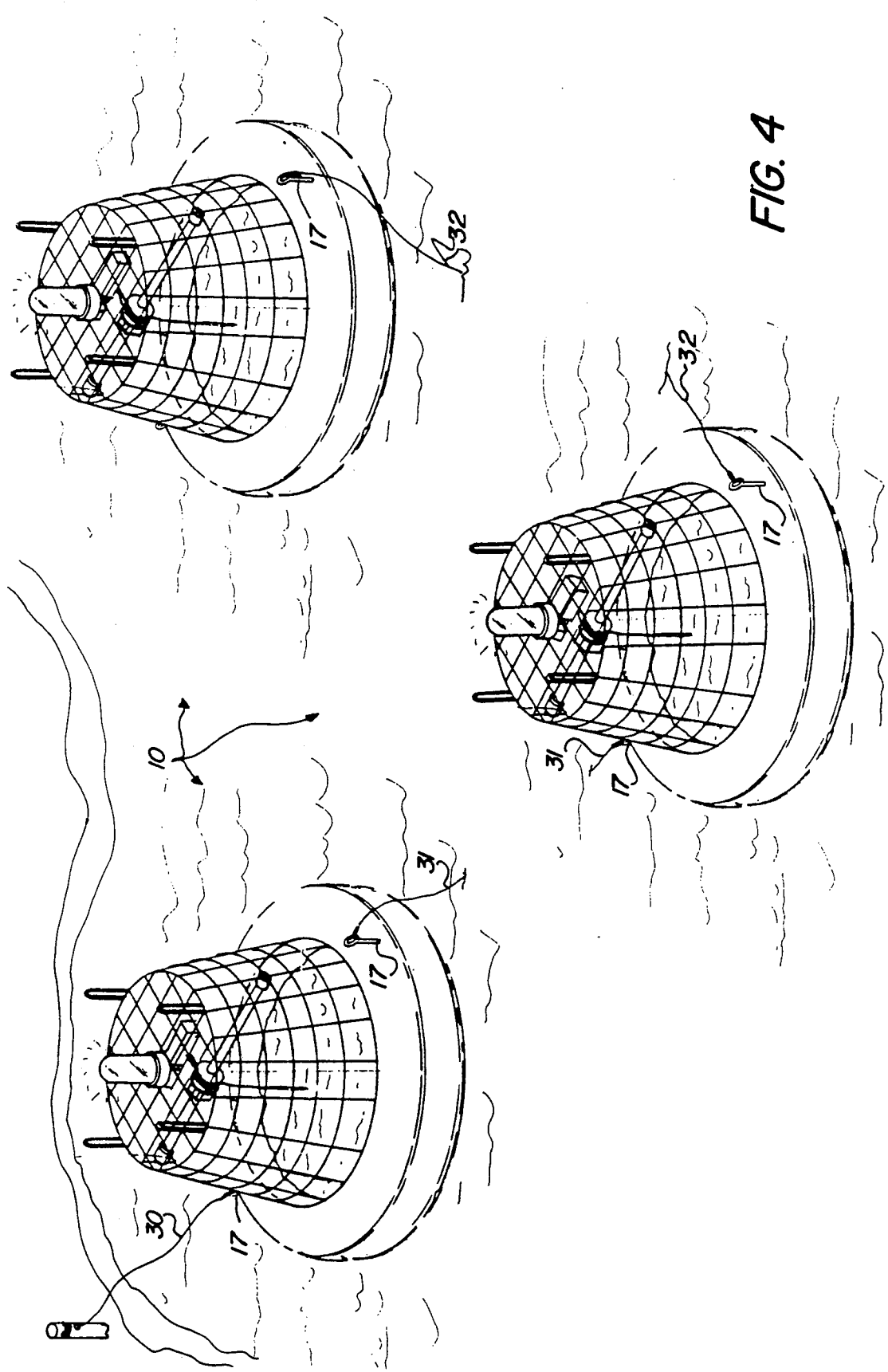
FIG. 4 is an isometric illustration of a plurality of the basket structure arranged in a tethered inter-relationship relative to one another.

With reference now to the drawings, and in particular to FIGS. 1 to 6 thereof, a new and improved floating fishing apparatus embodying the principles and concepts of the present invention and generally designated by the reference numerals 10 and 10a will be described.

More specifically, the floating fishing apparatus 10 of the instant invention essentially comprises a torroidal buoyant base 11 defined by a central base opening 12, including an outer ring 13, with an annular ring 14 extending upwardly relative to the annular ring that extends above a lower perimeter edge of a truncated inverted conical mesh basket 15 defined by a basket axis 15a symmetrically defining an axis of the torroidal base 11 and the mesh basket 15. The mesh basket 15 includes a mesh top wall 16 orthogonally oriented relative to the basket axis 15a, including plural pairs of diametrically opposed protective rods that are arranged parallel relative to one another and concentrically about the basket axis 15 integrally secured to an outer perimeter of the top wall 16. Further it should be noted a plurality of support loops 17 are mounted to the annular ring 14 for securement of tether lines, such as illustrated in the FIG. 4, utilizing respective first, second, and third respective tether lines 30, 31, and 32 to secure a plurality of the apparatus members 10 together.

Each of the rods 18 are defined by a predetermined height, wherein an illumination lens 19 mounted to the top wall 16 projecting upwardly thereof medially of the rods 18 is defined by a lens height than the predetermined height to afford protection to the lens. Illumination bulb 20 mounted within the illumination lens 19 is in electrical communication with a switch 21 in a normally on position and a battery 24. The switch 21 includes a switch rod 22 extending downwardly therefrom terminating in a rod loop 23 that guides a fishing line 26 from an associated fishing reel 25. The fishing reel 25 is mounted to a fishing reel retraction housing 27 that in turn is secured to a support axle 28 that is diametrically directed through the mesh basket 15 interiorly thereof. The fishing reel and retraction housing are arranged to effect automatic retraction of the associated fishing hook 26a mounted to a lower terminal end of the fishing line 26 upon a fish strike, in a manner as set forth in U.S. Pat. No. 3,878,634 incorporated herein by reference. In this manner upon a fish strike, the switch rod 22 is directed downwardly relative to the switch 21 effecting a switching off of electrical current from the battery 24 to the bulb 20 indicating a fish strike.

The apparatus 10a, as illustrated in the FIGS. 5 and 6, includes a fishing line guide loop 29 mounted to the outer ring 13 in confronting relationship to the central opening 12 guiding the fishing line 26 therethrough in cooperation with the switch loop 23. A torroidal hollow tube 33 concentrically formed through the outer ring 13 aligned with the basket axis 15a includes a plurality of ballast spheres 34 rotatably mounted therewithin. Upon rocking of the torroidal base 11, the ballast spheres 34 are displaced within the torroidal tube 13 effecting a rocking motion to the organization enhancing movement of the fishing line hook 26a to enhance a fishing procedure. To further induce such rocking, a wind sock 35 is mounted orthogonally to an upper distal end of the wind sock support rod 36 that in turn is rotatably mounted orthogonally relative to the mesh top wall 16 to catch wind therewithin to enhance a rocking motion of the organization in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A floating fishing apparatus, comprising,
   a torroidal base, the torroidal base including a central openign, and the torroidal base further formed as a buoyant member, and
   a mesh basket fixedly mounted to a top surface of the torroidal ring, wherein the mesh basket includes a basket axis, with the mesh basket symmetrically defined about the basket axis and the torroidal base symmetrically defined about the basket axis, and
   a fishing reel, the fishing reel including fishing line wound thereabout, and the fishing reel including retraction means for effecting automatic retraction of the fishing line about the fishing reel upon a fish strike, and
   switch means, the fishing line directed through the switch means, and
   an illumination bulb in electrical communication with the switch means, whereupon the fish strike, the switch means is actuated to effect deactivation of the illumination bulb.

2. An apparatus as set forth in claim 1 wherein the illumination bulb includes an illumination lens mounted about the illumination bulb extending upwardly of the mesh basket, wherein the mesh basket defines a mesh top wall orthogonally oriented relative to the basket axis, and the illumination lens fixedly mounted medially of the top wall, and further the top wall including plural pairs of diametrically opposed protective rods, the rods each defined by a predetermined height, and the illumination lens defined by a lens height less than the predetermined height, wherein the protective rods afford protection to the illumination lens, and the switch means includes a switch rod mounted to the switch means, and the switch rod includes a rod loop, with the fishing line directed through the rod loop.

3. An apparatus as set forth in claim 2 including at least one support loop mounted to the torroidal base extending upwardly thereof exteriorly of the mesh basket to permit tethering of the torroidal base to a support post.

4. An apparatus as set forth in claim 3 wherein the fishing reel includes a support axle diametrically directed through the fishing reel and diametrically aligned within the mesh basket orthogonally oriented relative to the basket axis.

5. An apparatus as set forth in claim 4 including a guide loop mounted to the torroidal base within the central opening, with the fishing line directed through the guide loop, and the torroidal base including a torroidal tube encased by the torroidal base, the torroidal tube including a plurality of ballast spheres rotatably mounted within the torroidal tube, whereupon rocking of the torroidal base effects displacement of the ballast spheres within the torroidal tube to effect enhanced rocking of the torroidal base.

6. An apparatus as set forth in claim 5 including a wind sock, the wind sock fixedly mounted to an upper distal end of the wind sock support rod, the wind sock support rod rotatably mounted to the mesh top wall to receive wind therewithin and effect enhanced rocking of the torroidal base.

* * * * *